United States Patent
Lee (10) Patent No.: US 8,196,256 B2
(45) Date of Patent: *Jun. 12, 2012

(54) BACKING STRIP FOR WINDSHIELD WIPER

(75) Inventor: Albert Lee, Baltimore, MD (US)

(73) Assignee: Alberee Products, Inc., Baltimore, MD (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/715,112

(22) Filed: Mar. 1, 2010

(65) Prior Publication Data

US 2010/0154160 A1 Jun. 24, 2010

Related U.S. Application Data

(60) Division of application No. 11/513,137, filed on Aug. 31, 2006, now Pat. No. 7,690,116, which is a continuation-in-part of application No. 10/647,509, filed on Aug. 26, 2003, now Pat. No. 7,159,269.

(51) Int. Cl.
*B60S 1/38* (2006.01)

(52) U.S. Cl. ............ 15/250.451; 15/250.452; 15/250.44

(58) Field of Classification Search ............ 15/250.451, 15/250.452, 250.44, 250.43, 250.361, 250.453, 15/250.48

See application file for complete search history.

(56) References Cited

U.S. PATENT DOCUMENTS

| | | | |
|---|---|---|---|
| 3,616,485 A | 11/1971 | Quinlan et al. | |
| 4,782,549 A * | 11/1988 | Beneteau et al. | 15/250.452 |
| 4,796,326 A | 1/1989 | Beneteau et al. | |
| 5,231,730 A | 8/1993 | Schmid et al. | |
| 5,697,156 A | 12/1997 | Buechele | |
| 5,713,100 A | 2/1998 | Samatjis | |
| 6,185,805 B1 | 2/2001 | Rosiere et al. | |
| 7,159,269 B2 * | 1/2007 | Lee | 15/250.452 |
| 2002/0050019 A1 | 5/2002 | Orjela et al. | |

FOREIGN PATENT DOCUMENTS

| | | |
|---|---|---|
| DE | 3208749 | 10/1982 |
| EP | 0465095 | 1/1992 |
| WO | WO-97/00796 | 1/1997 |
| WO | WO-97/21569 | 6/1997 |

* cited by examiner

*Primary Examiner* — Gary Graham (74) *Attorney, Agent, or Firm* — Birch, Stewart, Kolasch & Birch, LLP (57) ABSTRACT

A backing strip for a windshield wiper assembly includes a pair of rails. Each of the pair of rails includes a body portion and a detent portion. The detent portion includes a cut-out on each side thereof. The cut-outs form at least a pair of hooks on each side of said detent portion. The cut-out on one side of the detent portion of each of said rails is for receiving a claw of the windshield wiper assembly and the hooks on the opposite side of the detent portion of each of the rails are for engaging a windshield wiper blade of the windshield wiper assembly.

4 Claims, 7 Drawing Sheets

BACKING STRIP FOR WINDSHIELD WIPER

CROSS-REFERENCE TO RELATED APPLICATIONS

This nonprovisional application is a Rule 53(b) Divisional of application Ser. No. 11/513,137 filed Aug. 31, 2006 now U.S. Pat. No. 7,690,116, which is a Continuation-In-Part of U.S. patent application Ser. No. 10/647,509, filed on Aug. 26, 2003 now U.S. Pat. No. 7,159,269, the entirety of which is incorporated herein by reference.

BACKGROUND OF THE INVENTION

1. Field of the Invention

The present invention relates to a backing strip for a windshield wiper assembly. In particular, the present invention is directed to a backing strip for a windshield wiper assembly which stiffens the windshield wiper blade while allowing the windshield wiper blade to flex to conform to the curvature of a windshield of a vehicle. The present invention is also directed to a rail for a backing strip for a windshield wiper assembly, a windshield wiper assembly including the rail, and a method of manufacturing a rail for a backing strip for a windshield wiper assembly.

2. Description of Related Art

Various types of backing strips for windshield wiper assemblies are known. For example, U.S. Pat. No. 6,185,805 is directed to a method of forming a windshield wiper. The windshield wiper includes a wiping blade having two recesses for receiving a pair of backing strips. The backing strips include two teeth for retaining the backing strip and two stops which receive a claw of the windshield wiper. However, the stops which are formed on one side of each of the backing strips must be used such that they face outwardly to receive the claw of the windshield wiper. In view of this, it is not possible to use the backing strips such that either side of the backing strips can receive the claw of the windshield wiper.

In addition, U.S. Pat. No. 5,231,730 is directed to a wiper blade with a reinforcing rail locating means. The rails include recesses on opposite sides thereof that are located at opposite ends of the rail. This provides reversibility of the rails. However, the recesses in the rails are not for receiving a claw of a windshield wiper assembly, but are for receiving an increased thickness portion of the wiper blade. In view of this, the rails can only be used with a non-extruded wiper blade.

SUMMARY OF THE INVENTION

Accordingly, it is an object of the present invention to provide a backing strip for a windshield wiper assembly, which eliminates the above problems encountered with conventional windshield wiper frame connectors.

It is another object of the present invention to provide a backing strip for a windshield wiper assembly which includes rails having a detent portion on only one end. This allows the manufacture of a single rail, which can be used on either side of a windshield wiper blade to secure the windshield wiper blade to a windshield wiper assembly.

It is yet another object of the present invention to provide a backing strip for a windshield wiper assembly which can be used with an extruded windshield wiper blade and prevent the windshield wiper blade from sliding with respect to the remaining portions of the windshield wiper assembly.

It is a further object of the present invention to provide a backing strip for a windshield wiper assembly, which includes rails having a detent portion with a pair of symmetric cut-outs which form a central portion therebetween. The central portion is preferably formed to have a width, which is wider than a body of the rail to increase the amount of force applied by the claw of the windshield wiper assembly.

It is an additional object of the present invention to provide a backing strip for a windshield wiper assembly, which is inexpensive and easy to manufacture. In addition, it is an object of the present invention to provide a backing strip for a windshield wiper assembly which requires only one type of rail that can be used on either side of a windshield wiper blade.

The above objects are accomplished by a backing strip for windshield wiper assembly, comprising a pair of rails, each of said pair of rails including a body portion and a detent portion, said detent portion including a cut-out on each side thereof, said cut-outs being generally symmetric with each other and forming a pair of hooks on each side of said detent portion, wherein the cut-out on one side of said detent portion of each of said rails is for receiving a claw of the windshield wiper assembly and the hooks on the opposite side of the detent portion of each of the rails are for engaging a windshield wiper blade of the windshield wiper assembly.

The above objects are also accomplished by a rail for a backing strip for a windshield wiper assembly, comprising a body portion and a detent portion, said detent portion including a cut-out on each side thereof, said cut-outs being generally symmetric with each other and forming a pair of hooks on each side of said detent portion, wherein the cut-out on one side of said detent portion is for receiving a claw of the windshield wiper assembly and the hooks on the opposite side of the detent portion are for engaging a windshield wiper blade of the windshield wiper assembly.

The above objects are also accomplished by a windshield wiper assembly, comprising a windshield wiper claw; a windshield wiper blade; and a pair of rails, each of said pair of rails including a body portion and a detent portion, said detent portion including a cut-out on each side thereof, said cut-outs forming at least a pair of hooks on each side of said detent portion, at least a portion of said detent portion being decreased in thickness with respect to said body portion, wherein the pair of rails are oriented so that the hooks on one side of the detent portion of a first of the pair of rails extend inwardly from a top of the first rail to engage the windshield wiper blade and the hooks on one side of the detent portion of a second of the pair of rails extend inwardly from a bottom of the second rail to engage the windshield wiper blade.

The above objects are also accomplished by a method of manufacturing a rail for a backing strip for a windshield wiper assembly, said method comprising the steps of forming a body member having a generally rectangular cross-section; stamping a portion of said body member to form a decreased thickness portion; and cutting out a portion of said decreased thickness portion to form a detent portion having a cut-out on each side thereof, said cut-outs forming a pair of hooks on each side of said detent portion, wherein the cut-out on one side of said detent portion is for receiving a claw of the windshield wiper assembly and the hooks on the opposite side of the detent portion is for engaging a windshield wiper blade of the windshield wiper assembly Further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
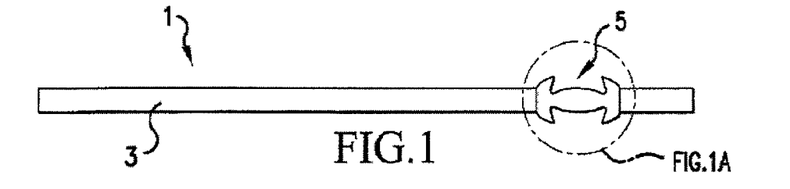
FIG. 1 is a top view of a backing strip for a windshield wiper according to a first embodiment of the present invention.

Referring now in detail to the accompanying drawings, the preferred embodiments of the present invention will be described. Referring to FIG. 1, a rail 1 includes a body portion 3 and a detent portion 5. The body 3 of the rail 1 is elongated, flat and generally rectangular in cross-section. The detent portion 5 is formed adjacent only one end of the body 3.

The rail 1 of the present invention can be formed of any material that can provide the necessary rigidity to a windshield wiper blade, while permitting the windshield wiper blade to conform to the curvature of the windshield of a vehicle. It is preferred that the rail 1 of the present invention be constructed from stainless steel; however, other materials will be readily understood to one having ordinary skill in the art.

Figure 1A:
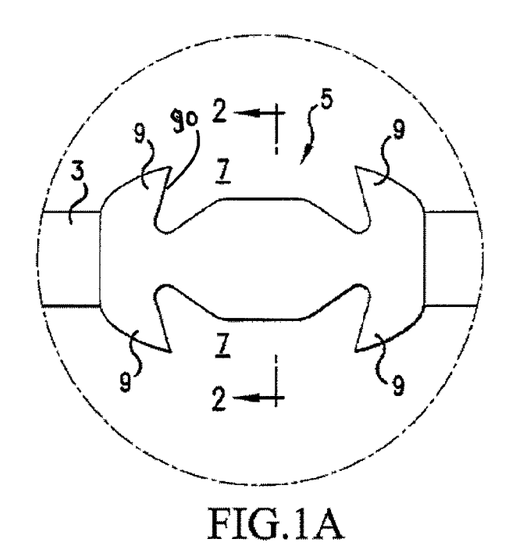
FIG. 1A is a detail view of a portion of FIG. 1.
Figure 3:
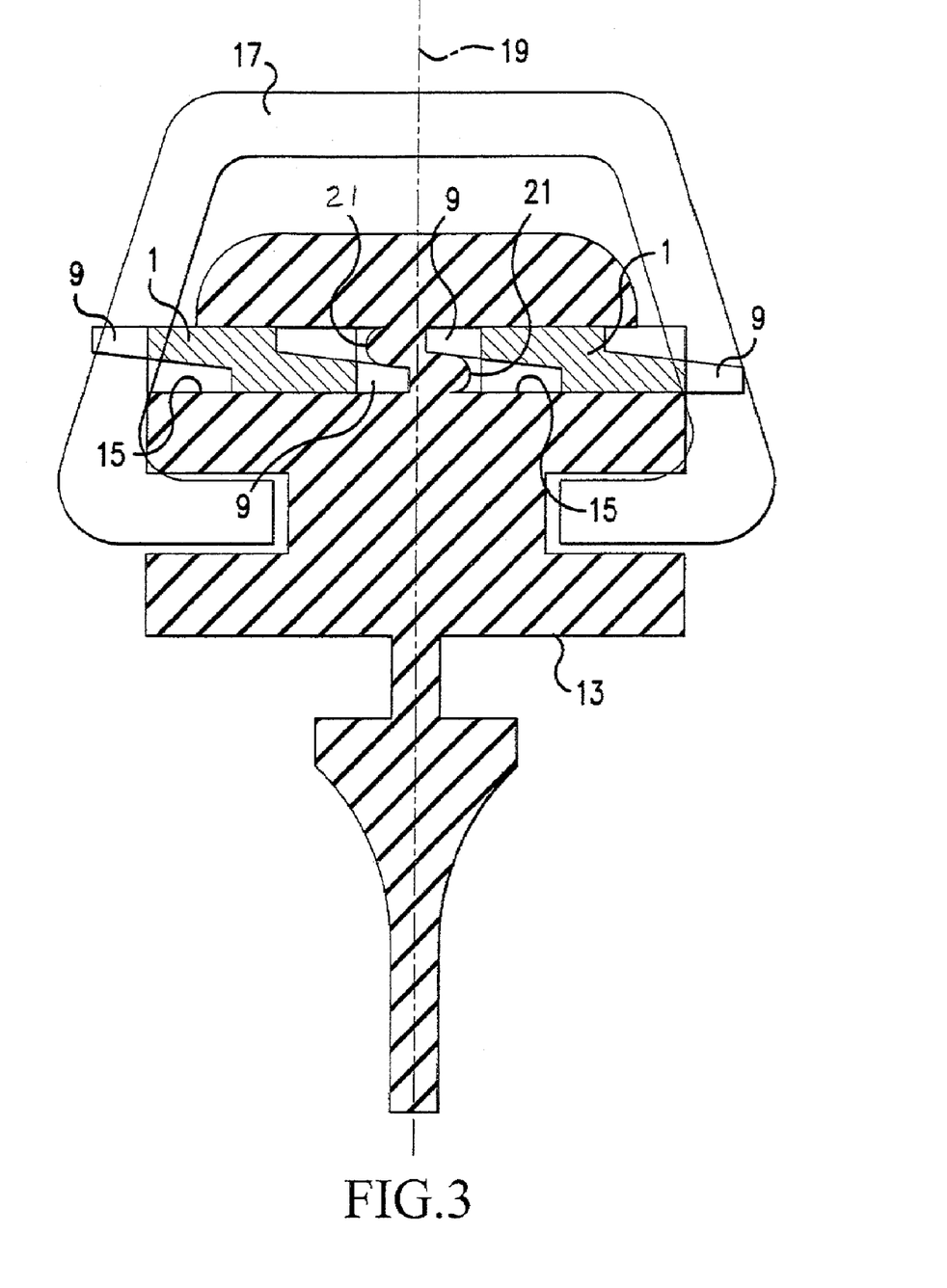
FIG. 3 is a cross-sectional view of the first construction of the first embodiment of the present invention in use on a windshield wiper assembly.
Figure 4:
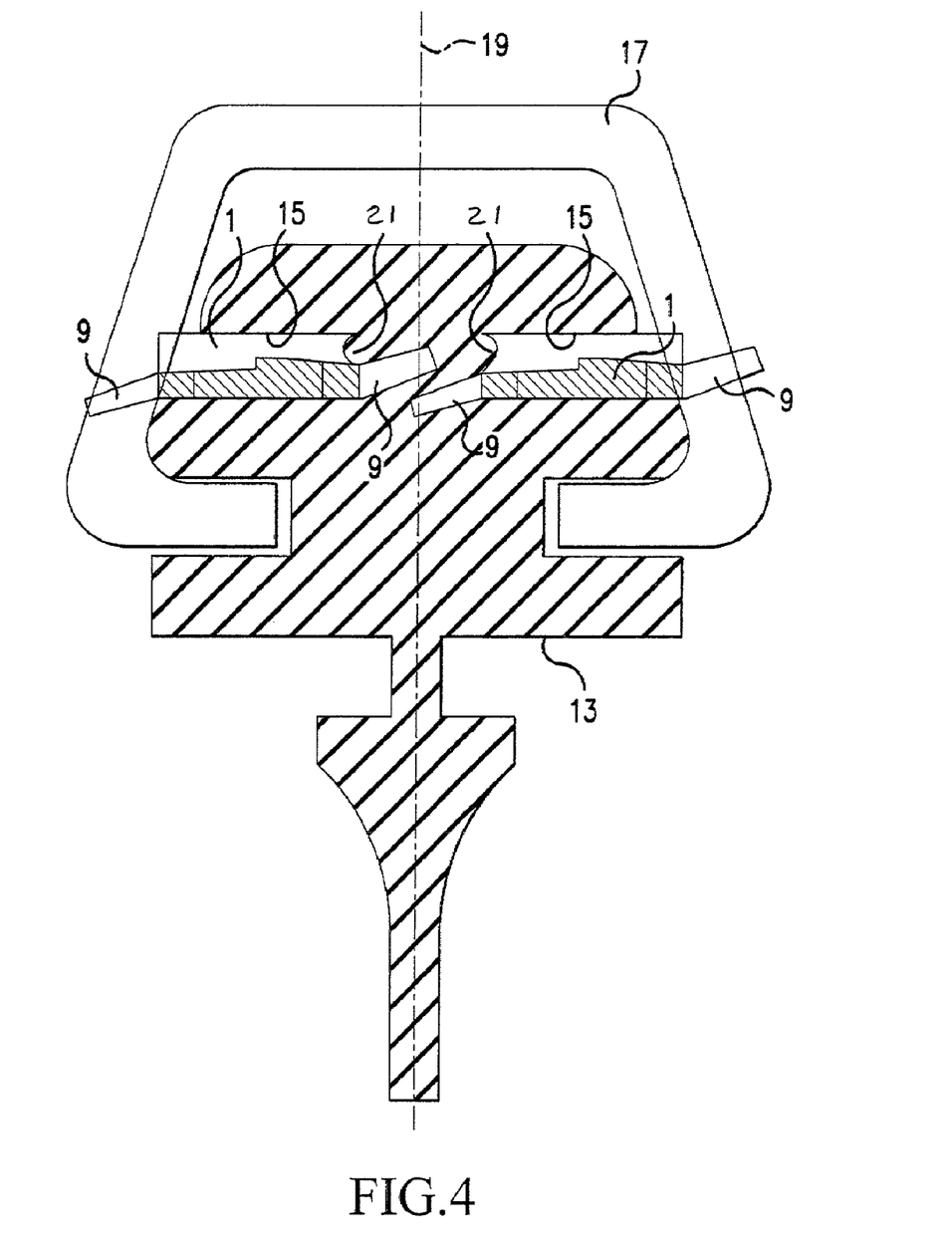
FIG. 4 is a cross-sectional view of the third construction of the first embodiment of the present invention in use on a windshield wiper assembly.
Figure 5:
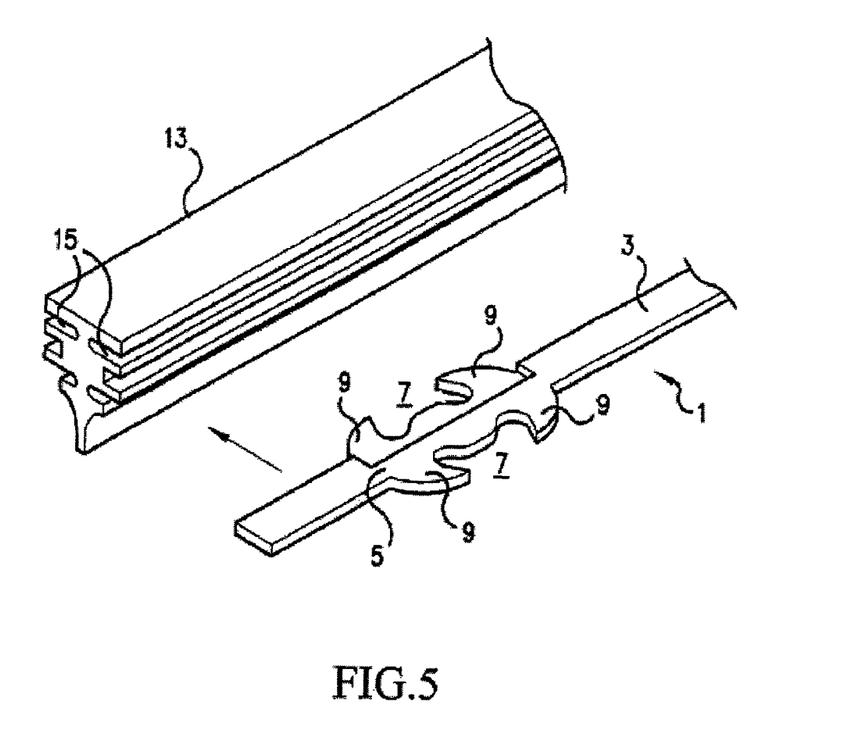
FIG. 5 is an explanatory perspective view of the first construction of the first embodiment of the present invention.

Referring to FIG. 1A, the detent portion 5 includes a pair of cut-outs 7, which form a pair of hooks 9 on each side of the detent portion 5. Referring to FIGS. 3-5 of the present invention, a rail 1 is received in a windshield wiper blade 13 of a windshield wiper assembly on each of opposite sides thereof. The windshield wiper blade 13 can also be referred to as a squeegee or rubber squeegee. Specifically, the rails 1 are received in slots 15 formed in sides of the windshield wiper blade 13. A claw 17 of the windshield wiper assembly is received in the detent portions 5 of each of the rails 1. Specifically, the outer openings 7 in each of the detent portions 5 of the rails 1 receive the claw 17 of the windshield wiper assembly, while the inner hooks 9 of the detent portion in each of the rails 1 cooperate with each other to secure the windshield wiper blade 13 therebetween. The hooks 9 on at least one side of the detent portions 5 have an internal edge 90 formed by a respective cut-out 7 which is non-perpendicular to a longitudinal direction of the body 3. The internal edge 90 is formed at an angle of 85° or less with respect to the longitudinal direction of the body 3.

Figure 2A:
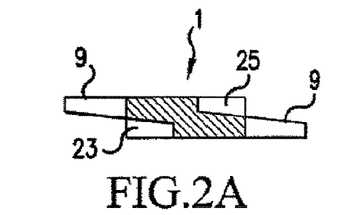
FIG. 2A is a cross-sectional view along the line 2-2 of FIG. 1A according to a first construction of the first embodiment of the present invention.

Referring to FIGS. 2A and 3 of the present invention, the rails 1 according to the first construction of the first embodiment of the present invention include hooks 9 extending outwardly from a top of the detent portion 5 and hooks 9 extending from a bottom of the detent portion 5. When the rails 1 are mounted to the windshield wiper blade 13, the top hooks 9 in one rail 1 are oriented to extend toward a center of the windshield wiper assembly and the top hooks 9 in the opposite rail 1 are oriented to extend away from the center of the windshield wiper assembly. In view of this, when the claw 15 is received within the cut-outs 7, the hooks 9 in each of the rails 1 cooperate with each other to secure the windshield wiper blade 13 therebetween.

Referring to FIG. 3, the windshield wiper blade 13 is made of a flexible material. In view of this, when the claw 17 is secured within the detent portions 5 of the rails 1, the material of the windshield wiper blade 13 flexes and the hooks 9 push into the material of the windshield wiper blade 13 to secure the windshield wiper blade 13 to the windshield wiper assembly in a secure manner. In view of this, the windshield wiper blade 13 is prevented from sliding with respect to the claw 17 and therefore the windshield wiper assembly.

It should be noted that it is preferred that the hooks 9 of the opposite rails 1 overlap each other with the material of the windshield wiper blade 13 being located therebetween. In FIG. 3, the hooks are not illustrated in overlapping manner; however, it is preferred that each of the hooks 9 of the rails 1 cross over the center line 19, so that the hooks 9 overlap each other. This provides a more secure attachment of the rails 1 to the windshield wiper blade 13.

Referring to FIG. 3, the material of the windshield wiper blade 3 bulges at 21 to permit the hooks 9 to overlap with each other when the rails are secured by the claw 17. Since the opposite rails 1 include hooks that are displaced vertically from each other, rather than aligned with each other, the material of the windshield wiper blade 13 is allowed to be displaced to form the bulges 21. This bulging of the windshield wiper blade 13 further secures the rails 1 to the windshield wiper blade 13.

Referring again to FIG. 1 of the present invention, a central portion of the detent portion 1 is formed to have a width which is greater than a width of the body 3. In view of this, when the claw 17 is mounted within the cut-outs 7 of the detent portion 5 of the rails 1, a force applied to rails 1 is increased, such that the rails 1 are pushed further inward toward the center of the windshield wiper assembly. It should be understood that increasing the width of the central portion in conjunction with decreasing the width of the claw 17 will control the amount of overlap, if any, of the hooks 9 of the cooperating rails 1.

Figure 2B:
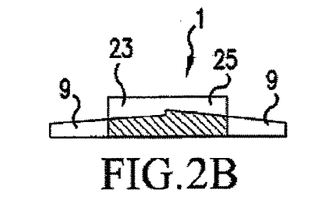
FIG. 2B is a cross-sectional view along the line 2-2 of FIG. 1A according to a second construction of the first embodiment of the present invention.

Referring to FIG. 2B of the present invention, the second construction of the first embodiment of the present invention will be described. FIG. 2B is a cross-section along the lines 2-2 of FIG. 1A and illustrates the second construction of the first embodiment of the present invention, which includes a top portion of the detent portion 5 having a thickness which is decreased across an entire width. In view of this, the hooks 9 on one side of the rail 1 are thicker than the hooks 9 on the opposite side of the rail 1. Accordingly, when the rails 1 according to the second construction of the first embodiment of the present invention are mounted to the windshield wiper blade 13, the thicker hooks 9 on one rail cooperate with the thinner hooks of the opposite rail to secure the material of the windshield wiper blade 13 therebetween. The second construction of the first embodiment of the present invention has not been illustrated in use with the windshield wiper blade 13; however, the operation can easily be understood from a review of FIG. 3. Of course, as would be understood to one having ordinary skill in the art, when the rails 1 of FIG. 2B are mounted to the windshield wiper blade 13, the pair of rails 1 are oriented so that the hooks 9 on one side of the detent portion 5 of a first of the pair of rails 1 extend outwardly from a top of the first rail 1 to engage the windshield wiper claw 17 and the hooks 9 on one side of the detent portion 5 of a second of the pair of rails 1 extend outwardly from a bottom of the second rail 1 to engage the windshield wiper claw 17. In this way, as mentioned above, the thicker hooks 9 on one rail 1 cooperate with the thinner hooks 9 of the opposite rail 1 to secure the material of the windshield wiper blade 13 therebetween.

Figure 2C:
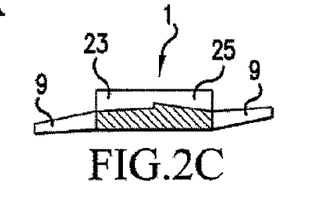
FIG. 2C is a cross-sectional view along the line 2-2 of FIG. 1A according to a third construction of the first embodiment of the present invention.

Referring to FIG. 2C of the present invention, the third construction of the first embodiment of the present invention is illustrated. FIG. 2C is also a cross-section along the line 2-2 of FIG. 1A. Referring to FIG. 2C, the cross-section of the detent portion 5 of the rail 1 is the same as the second construction of the first embodiment of FIG. 2B, except that the hooks 9 on one side have been bent upwardly and the hooks 9 on the opposite side have been bent downwardly.

Referring to FIG. 4 of the present invention, the third construction of the first embodiment of the present invention is illustrated schematically in use. Specifically, the rails 1 are mounted in the slots 15 of the windshield wiper blade 13. The rail 1 on one side of the windshield wiper blade 13 is mounted such that the hooks having an upward bend extend toward the center line 19, while the rail 1 on the opposite side is mounted such that the hooks having a downward bend extend toward the center line 19. In view of this, when the claw 17 is received within the openings 7 in each of the rails 1, the inner hooks of the rails 1 overlap each other and secure the windshield wiper blade 13 therebetween The rail 1 according to the first embodiment of the present invention is manufactured by forming a generally rectangular base member. A portion of the base member is stamped to decrease the thickness of the base member and therefore form the base portion 3 and the decreased thickness portion which will be used for the detent portion 5.

In FIG. 2A, the stamping is carried out by a top die and a bottom die (not shown) that have raised portions to form the decreased thickness portion to have the cross-sectional shape illustrated in FIG. 2A. Specifically, the stamping is carried out to form a decreased thickness portion 23 on the bottom on one side of the detent portion 5 and a decreased thickness portion 25 on the top on the opposite side of the detent portion 5.

As an alternative, the bottom die can be flat and the top die can have raised portions to form the decreased thickness portion into the shape illustrated in FIG. 2B. Specifically, the stamping is carried out to form a decreased thickness portion 23 on one side of the detent portion 5 which is thinner than a decreased thickness portion 25 on the opposite side of the detent portion 5.

The next step in the manufacture of the rail 1 is to cut out portions of the decreased thickness portions 23, 25 on each side of the detent portion 5 to form the cut-outs 7. In FIGS. 2A and 2B, the cut-outs are formed without bending the hooks 9, while in FIG. 2C, the cut-outs are formed at the same time as the hooks on one side of the rail 1 bent upwardly and the hooks 9 on the opposite side are bent downwardly. The cutting and bending in the third construction of the first embodiment of FIG. 2C can easily be performed by a die having a cutting portion and a bending portion (not shown).

Referring to FIG. 5, the first construction of the first embodiment of the present invention is illustrated in perspective view along with a windshield wiper blade 13. As identified by the arrow, the rail 1 is inserted into the slot 15 on each side of the windshield wiper blade 13. The inner hooks 9 of the illustrated rail 1 (the other rail is not shown) engage a bottom of the inner wall of the slot 15, since the inner hooks 9 extend from a bottom of the detent portion 5. As can be understood, the rail on the opposite side would have the inner hooks 9 extending from the top side of the detent portion 5 so that the inner rails 9 of the two rails cooperate with each other to secure the windshield wiper blade 13 therebetween. This arrangement is clearly illustrated in FIG. 3.

After the rails 1 are inserted into the slots 15, the claw 17 is secured within the outer cut-outs in each of the rails 1. This forces the inner hooks 9 to overlap with each other to strongly secure the windshield wiper blade 13 to the rails 1 to prevent sliding of the windshield wiper blade 13.

Referring to FIGS. 6-10, a second embodiment of the present invention will be described. The second embodiment is similar to the operation of the second construction of the first embodiment of the present invention that is illustrated in FIG. 2B. The same reference numerals have been used in FIGS. 6-10 to identify the same or similar elements. Therefore, only the differences between the first and second embodiments will be described in detail.

Figure 6:
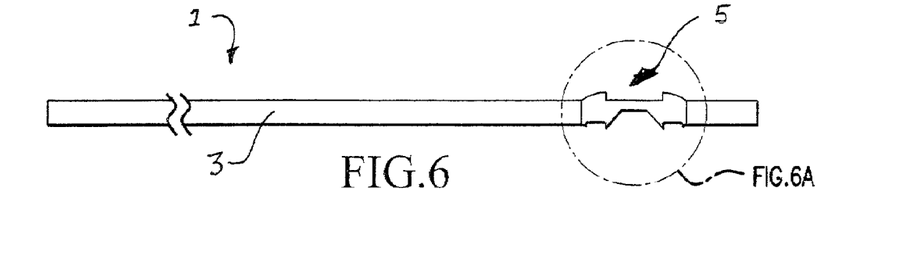
FIG. 6 is a top view of a backing strip for a windshield wiper according to a second embodiment of the present invention.
Figure 6A:
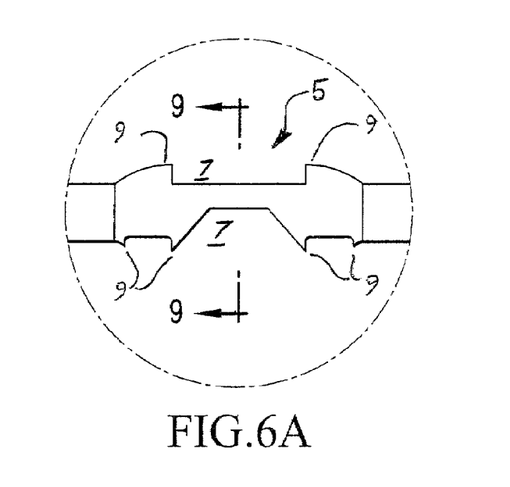
FIG. 6A is a detail view of a portion of FIG. 6.
Figure 7:
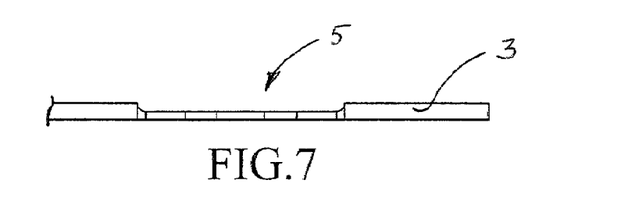
FIG. 7 is a side view of FIG. 6.
Figure 8:
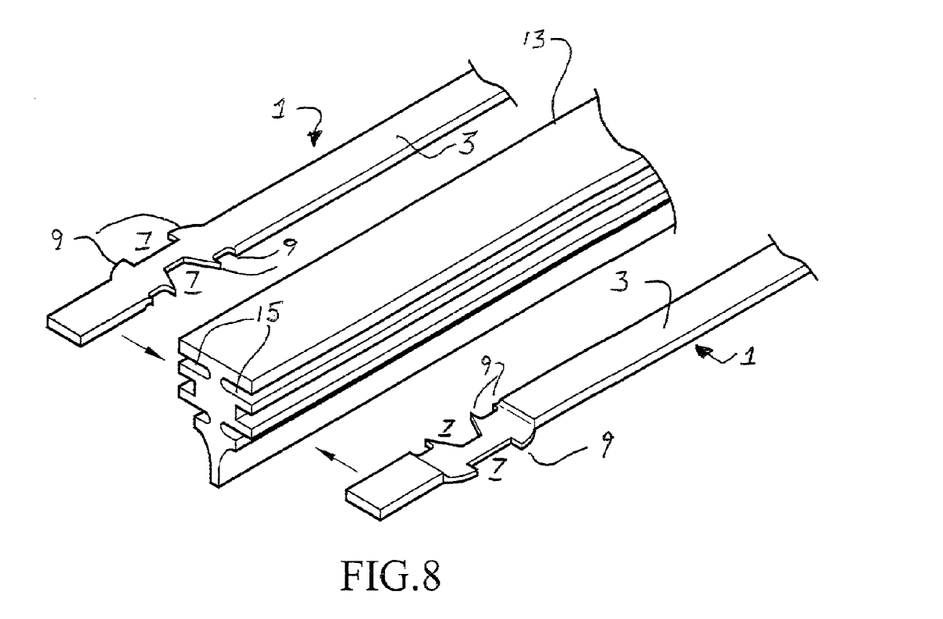
FIG. 8 is an explanatory perspective view of the second embodiment of the present invention.
Figure 9:
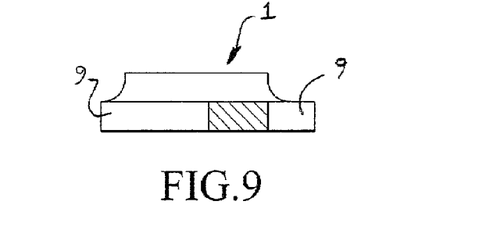
FIG. 9 is a cross-sectional view along the line 9-9 of FIG. 6A.
Figure 10:
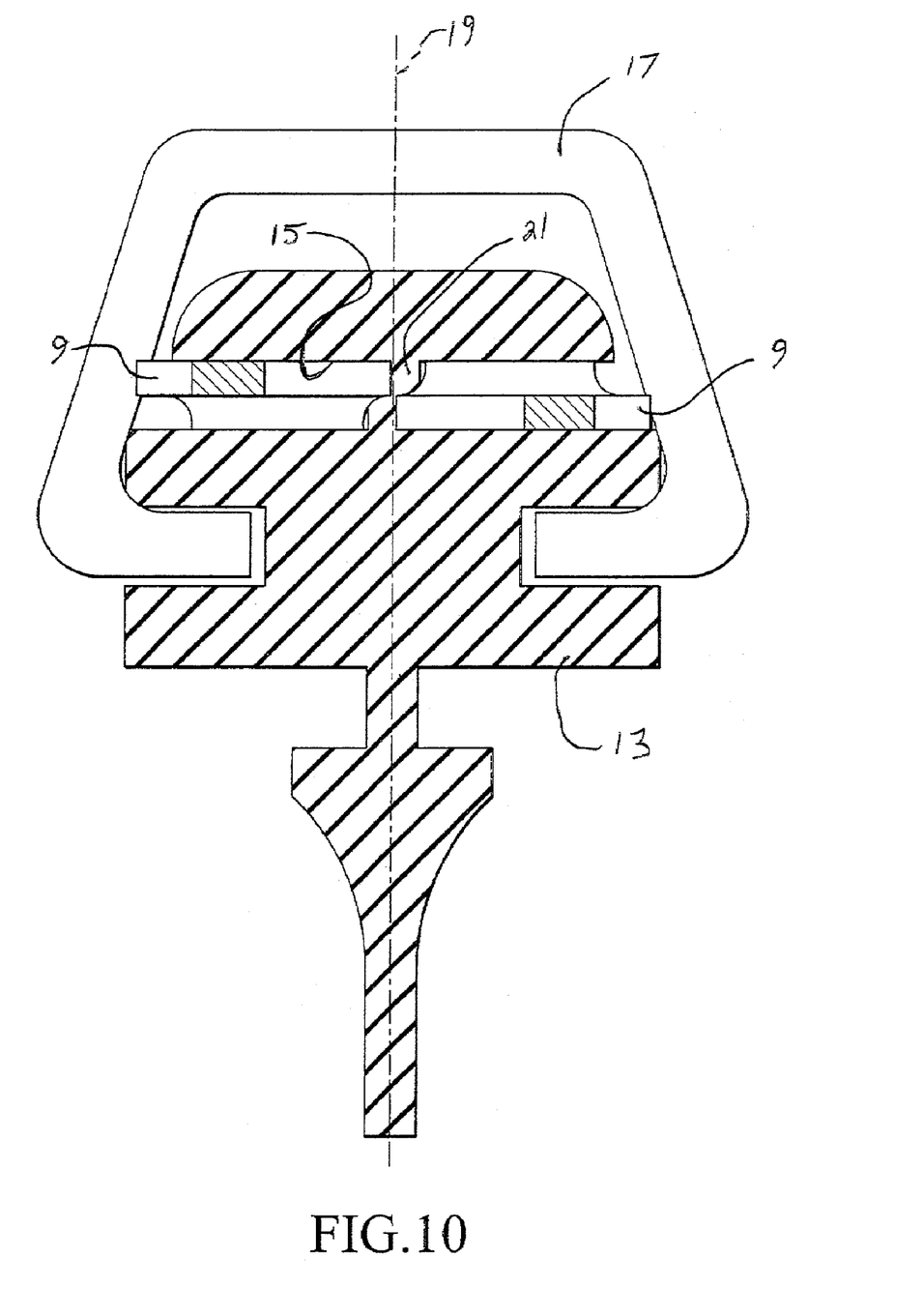
FIG. 10 is a cross-sectional view of the second embodiment of the present invention in use on a windshield wiper assembly.

Referring to FIG. 9, a cross-section along the lines 9-9 of FIG. 6A is illustrated. Cut-outs 7 are formed on each side of the detent portion 5. However, four hooks 9 are formed on the inside (the side intended to face the windshield wiper blade 13) of each rails 1 and two hooks are formed on the outside (the side intended to face the claw 17) of each of the rails 1 (See FIG. 8).

In addition, a top portion of the detent portion 5 has a thickness, which is decreased across an entire width. However, the hooks 9 on one side of the rail 1 are the same thickness as the hooks 9 on the opposite side of the rail 1. When the rails 1 according to the second embodiment of the present invention are mounted to the windshield wiper blade 13, the hooks 9 on one rail cooperate with the hooks of the opposite rail to secure the material of the windshield wiper blade 13 therebetween. The operation of the second embodiment of the present invention can be understood from a review of FIG. 10. Specifically, when the rails 1 of the second embodiment are mounted to the windshield wiper blade 13, the pair of rails 1 are oriented so that the hooks 9 on one side of the detent portion 5 of a first of the pair of rails 1 extend outwardly from a top of the first rail 1 to engage the windshield wiper claw 17 and the hooks 9 on one side of the detent portion 5 of a second of the pair of rails 1 extend outwardly from a bottom of the second rail 1 to engage the windshield wiper claw 17. In this way, as mentioned above, the four hooks 9 on one rail 1 cooperate with the four hooks 9 of the opposite rail 1 to secure the material of the windshield wiper blade 13 therebetween. In addition, the two hooks 9 of each of the rails 1 extend outwardly to cooperate with the windshield wiper claw 17.

The second embodiment of the present invention is advantageous, since four hooks 9 on each rail 1 are provide facing the windshield wiper blade. This construction improves the holding strength of the rails 1, since four hooks engage the windshield wiper blade 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield wiper assembly, comprising:
   a windshield wiper claw;
   a windshield wiper blade; and
   a pair of rails, each of said pair of rails including a body portion and a detent portion, said detent portion including a cut-out on each side thereof, said cut-outs forming at least a pair of hooks on each side of said detent portion, at least a portion of said detent portion being decreased in thickness with respect to said body portion, wherein the pair of rails are oriented so that the hooks on one side of the detent portion of a first of the pair of rails extend inwardly from a top of the first rail to engage the windshield wiper blade and the hooks on one side of the detent portion of a second of the pair of rails extend inwardly from a bottom of the second rail to engage the windshield wiper blade.

2. The windshield wiper assembly according to claim 1, wherein the pair of rails are oriented so that the hooks on a second side of the detent portion of the first rail extend outwardly from a top of the first rail to engage the windshield wiper claw and the hooks on a second side of the detent portion of the second rail extend outwardly from a bottom of the second rail to engage the windshield wiper claw.

3. The windshield wiper assembly according to claim 1, wherein said hooks on at least one side of said detent portions have an internal edge formed by a respective cut-out which is non-perpendicular to a longitudinal direction of said body.

4. The windshield wiper assembly according to claim 3, wherein said internal edge is formed at an angle of 85° or less with respect to the longitudinal direction of said body.

* * * * *